(12) United States Patent
Koduru et al.

(10) Patent No.: US 11,566,190 B2
(45) Date of Patent: Jan. 31, 2023

(54) INTEGRATING EBULLATED BED HYDROCRACKING AND COKING UNITS

(71) Applicant: LUMMUS TECHNOLOGY LLC, Bloomfield, NJ (US)

(72) Inventors: Suresh B. Koduru, Bloomfield, NJ (US); Arun Arora, Edison, NJ (US)

(73) Assignee: LUMMUS TECHNOLOGY LLC, Houston, TX (US)

( * ) Notice: Subject to any disclaimer, the term of this patent is extended or adjusted under 35 U.S.C. 154(b) by 0 days.

(21) Appl. No.: 17/385,402

(22) Filed: Jul. 26, 2021

(65) Prior Publication Data
US 2022/0025283 A1 Jan. 27, 2022

Related U.S. Application Data

(60) Provisional application No. 63/056,337, filed on Jul. 24, 2020.

(51) Int. Cl.
*C10G 67/14* (2006.01)
*C10G 47/26* (2006.01)
(Continued)

(52) U.S. Cl.
CPC .............. *C10G 67/14* (2013.01); *C10B 55/00* (2013.01); *C10G 7/06* (2013.01); *C10G 45/00* (2013.01);
(Continued)

(58) Field of Classification Search
CPC .......... C10G 67/14; C10G 7/06; C10G 45/00; C10G 47/26; C10G 2300/107;
(Continued)

(56) References Cited

U.S. PATENT DOCUMENTS 9,546,330 B2 1/2017 Koseoglu et al.
2010/0122932 A1* 5/2010 Haizmann .............. C10G 47/26
208/124

(Continued)

OTHER PUBLICATIONS

International Search Report issued in International Application No. PCT/US2021/043163 dated Nov. 17, 2021 (3 pages).
(Continued)

*Primary Examiner* — Randy Boyer
*Assistant Examiner* — Juan C Valencia
(74) *Attorney, Agent, or Firm* — Osha Bergman Watanabe & Burton LLP

(57) ABSTRACT

Integrated processes and systems for the production of distillate hydrocarbons and coke. The process may include feeding a hydrocarbon feedstock, comprising a residuum hydrocarbon fraction, to a residue hydrocracking reactor system to convert hydrocarbons therein, producing a hydrocracked effluent. The hydrocracked effluent may then be fed to a separation system, separating the hydrocracked effluent into one or more distillate hydrocarbon fractions and a vacuum residue fraction. The vacuum residue fraction may be fed to a coker system, converting the vacuum residue fraction into a coke product and a coker vapor effluent, recovering the coke product, and feeding the coker vapor effluent to the separation system. The one or more distillate hydrocarbon fractions are hydroprocessed to produce a hydroprocessed effluent, and the hydroprocessed effluent is separated into product distillate hydrocarbon fractions.

12 Claims, 3 Drawing Sheets

(51) Int. Cl.
    *C10G 7/06*       (2006.01)
    *C10G 45/00*      (2006.01)
    *C10B 55/00*      (2006.01)
(52) U.S. Cl.
    CPC ....... *C10G 47/26* (2013.01); *C10G 2300/107* (2013.01); *C10G 2300/1077* (2013.01); *C10G 2300/4043* (2013.01); *C10G 2300/4081* (2013.01)
(58) Field of Classification Search
    CPC .... C10G 2300/1077; C10G 2300/4043; C10G 2300/4081; C10G 2400/02; C10G 2400/04; C10G 2400/06; C10G 2400/08; C10G 65/12; C10G 69/06; C10B 55/00; C10B 57/045
    See application file for complete search history.

(56) References Cited

U.S. PATENT DOCUMENTS

| | | |
|---|---|---|
| 2017/0002972 A1 | 2/2017 | Koseoglu |
| 2017/0029724 A1* | 2/2017 | Koseoglu ............... C10G 9/005 |
| 2018/0119034 A1* | 5/2018 | Sun ....................... C10G 65/12 |
| 2019/0040328 A1 | 2/2019 | Koseoglu |
| 2019/0185765 A1 | 6/2019 | Das et al. |

OTHER PUBLICATIONS

Written Opinion issued in International Application No. PCT/US2021/043163 dated Nov. 17, 2021 (4 pages).

\* cited by examiner

INTEGRATING EBULLATED BED HYDROCRACKING AND COKING UNITS

BACKGROUND

To date, coker units and residue hydrocracking units, such as ebullated bed hydrocracking units, have been operated as separate systems, each including a dedicated fractionation sections. A coker unit typically only has an atmospheric fractionation section, whereas residue hydrocracking units typically have both atmospheric and vacuum distillation columns.

Both units produce products that require further processing in hydrotreating and hydrocracking units to produce final saleable products. Further, the coker unit and residue hydrocracking units each process vacuum residue material. Straight run vacuum residue as a feed to a coker unit is typically added to the coker unit fractionator bottoms, where it is combined with the heavy coker gas oil material (520-550° C.+ hydrocarbons) and fed to the coker furnace.

Refiners have typically kept the fractionation section of both residue hydrocracking and coker units independent and relied on adding straight run atmospheric residue or vacuum residue to the residue hydrocracking fractionation section to mitigate fouling. Units that cannot add straight run atmospheric residue or vacuum residue generally have to rely on cleaning of the fouled section or lowering the residue hydrocracking unit severity.

Depending upon feed and severity, fractionation section fouling can cause residue hydrocracking unit shutdown every eleven to twelve months, where the shutdown may last for about two weeks for cleaning the vacuum tower bottom section. This requires in many instances turning the whole refinery at lower than design throughput as vacuum residue storage is typically limited to three to five days.

SUMMARY

Embodiments herein integrate residue hydrocracking and coker units in such a manner that offers higher operating factor while offering lower capital expense, lower CO2 footprint, and a smaller plot space footprint.

In one aspect, embodiments herein relate to an integrated process for the production of distillate hydrocarbons and coke. The process may include feeding a hydrocarbon feedstock, comprising a residuum hydrocarbon fraction, to a residue hydrocracking reactor system to convert hydrocarbons therein, producing a hydrocracked effluent. The hydrocracked effluent may then be fed to a separation system, separating the hydrocracked effluent into one or more distillate hydrocarbon fractions and a vacuum residue fraction. The vacuum residue fraction may be fed to a coker system, converting the vacuum residue fraction into a coke product and a coker vapor effluent, recovering the coke product, and feeding the coker vapor effluent to the separation system. The one or more distillate hydrocarbon fractions are hydroprocessed to produce a hydroprocessed effluent, and the hydroprocessed effluent is separated into product distillate hydrocarbon fractions.

In some embodiments, the process includes feeding a straight run vacuum residue to the separation system. The residue hydrocracking reactor system in some embodiments comprises one or more ebullated bed reactors.

The separation system of one or more embodiments comprises a light gas separator, an atmospheric distillation unit and a vacuum distillation unit. In such embodiments, the separating the hydrocracked effluent includes, in the light gas separator, separating the hydrocracked effluent to recover a light fraction, containing hydrogen and hydrocarbons having a boiling point of less than 35° C., and a heavy fraction. In the atmospheric distillation unit, the heavy fraction is separated into one or more atmospheric distillate fractions and an atmospheric residue fraction. Further, in the vacuum distillation unit, the atmospheric distillate fraction is separated into one or more vacuum distillate fractions and a vacuum residue fraction. In some embodiments, a straight run vacuum residue is provided to the atmospheric distillation unit.

The coker system of some embodiments further includes a flash drum. In such embodiments, the process includes separating the coker vapor effluent in the flash drum to recover a coker liquid fraction and a coker vapor fraction. The coker vapor fraction is fed to the atmospheric distillation unit, and the coker liquid fraction is fed to the vacuum distillation unit.

The process of various embodiments may also include recovering hydrogen from the hydroprocessed effluent and feeding recovered hydrogen to the residue hydrocracking reactor system.

In another aspect, embodiments herein are directed toward an integrated system for the production of distillate hydrocarbons and coke. The system may include a residue hydrocracking reactor system, a separation system, a coker system, a hydroprocessing reactor system, and a second separation system. The residue hydrocracking reactor system is configured to receive a hydrocarbon feedstock, comprising a residuum hydrocarbon fraction, and to convert hydrocarbons therein to produce a hydrocracked effluent. The separation system is configured for receiving and separating the hydrocracked effluent into one or more distillate hydrocarbon fractions and a vacuum residue fraction. The coker system is configured for receiving and converting the vacuum residue fraction into a coke product and a coker vapor effluent. A flow line is provided for feeding the coker vapor effluent to the separation system, mixing and separating the hydrocracked effluent and coker vapor effluent together. The hydroprocessing reactor system is configured for hydroprocessing the one or more distillate hydrocarbon fractions to produce a hydroprocessed effluent. The second separation system is configured for separating the hydroprocessed effluent into product distillate hydrocarbon fractions.

The residue hydrocracking reactor system may include one or more ebullated bed reactors.

The separation system of some embodiments includes a light gas separator, an atmospheric distillation unit and a vacuum distillation unit. The light gas separator is configured for separating the hydrocracked effluent to recover a light fraction, containing hydrogen and hydrocarbons having a boiling point of less than 35° C., and a heavy fraction. The atmospheric distillation unit is configured for separating the heavy fraction into one or more atmospheric distillate fractions and an atmospheric residue fraction. Further, the vacuum distillation unit is configured for separating the atmospheric distillate fraction into one or more vacuum distillate fractions and a vacuum residue fraction.

In some embodiments, a flow line is provided for feeding a straight run vacuum residue from a straight run vacuum feed source to the separation system. For example, in some embodiments a flow line is provided for feeding a straight run vacuum residue to the atmospheric distillation unit.

The coker system of one or more embodiments includes a flash drum. The flash drum is configured for separating the coker vapor effluent and to recover a coker liquid fraction and a coker vapor fraction. A flow line is provided for feeding the coker vapor fraction to the atmospheric distillation unit; and a flow line is provided for feeding the coker liquid fraction to the vacuum distillation unit.

The system of some embodiments also includes a hydrogen recovery system configured for recovering hydrogen from the hydroprocessed effluent, and a flow line for feeding recovered hydrogen to the residue hydrocracking reactor system.

Other aspects and advantages of the invention will be apparent from the following description and the appended claims.

DETAILED DESCRIPTION

Figure 1:
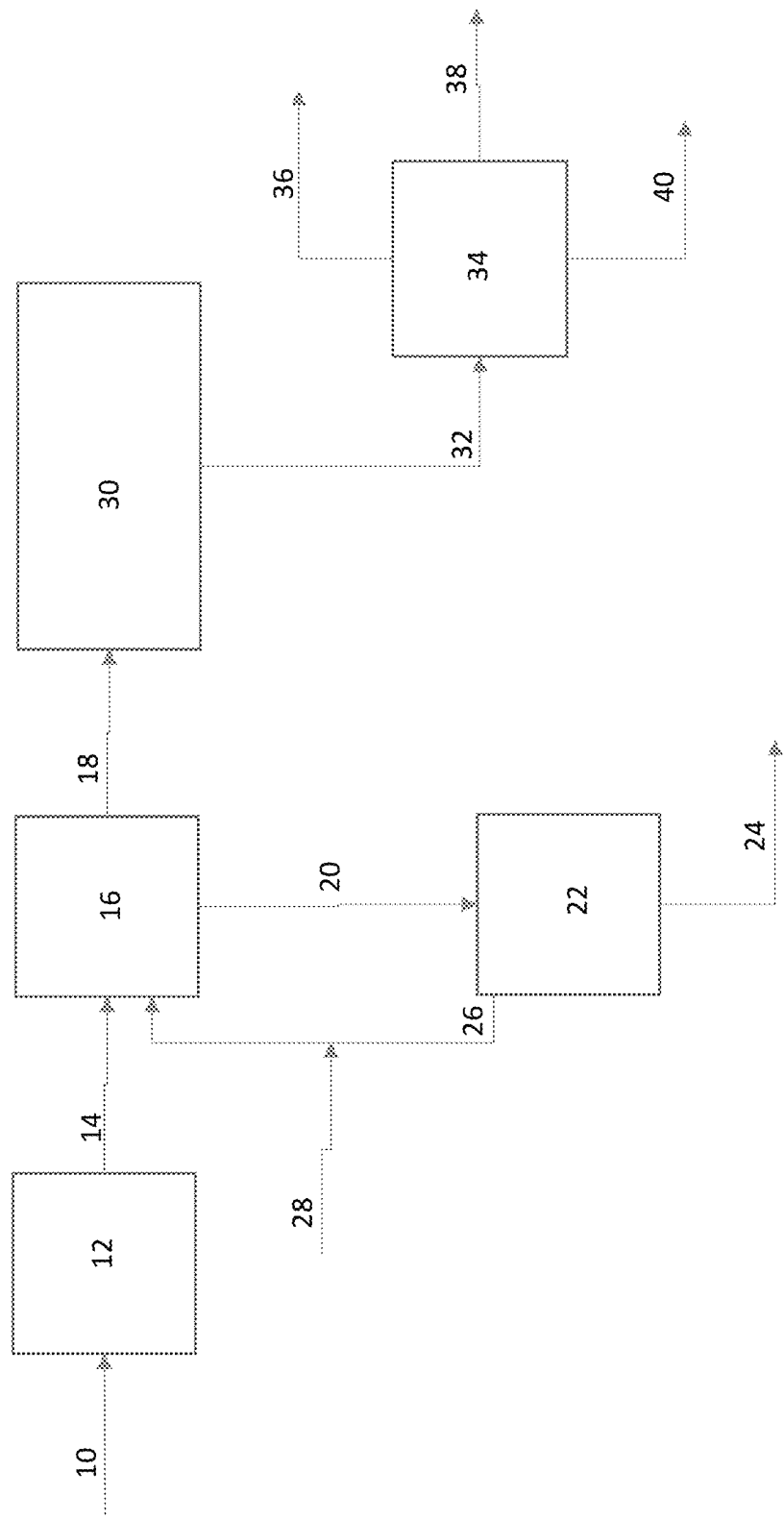
FIGS. 1-3 are block flow diagrams of integrated processes according to embodiments herein.

Embodiments herein relate generally to hydroconversion processes, including processes for hydrocracking residue, vacuum gas oil and other heavy hydrocarbon fractions. More specifically, embodiments disclosed herein relate to processing a residuum hydrocarbon feedstock or a heavy distillate feedstock in a residue hydrocracking unit, such as a fixed bed or an ebullated bed residue hydrocracking unit, integrated with a coking unit.

As used herein, residuum hydrocarbon fractions, or like terms referring to residuum hydrocarbons, are defined as a hydrocarbon fraction having boiling points or a boiling range above about 340° C. Residuum hydrocarbon feedstocks that may be used with processes disclosed herein may include whole crude, whole heavy crude, various refinery and other hydrocarbon streams such as petroleum atmospheric or vacuum residua, deasphalted oils, deasphalter pitch, hydrocracked atmospheric tower or vacuum tower bottom, fluid catalytically cracked (FCC) slurry oils, residua derived from one or more of shale-derived oils, coal-derived oils, tar sands bitumen, tall oils, bio-derived crude oils, black oils, as well as other similar hydrocarbon streams, or a combination of these, each of which may be straight run, process derived, hydrocracked, partially desulfurized, and/or partially demetallized streams. In some embodiments, residuum hydrocarbon fractions may include hydrocarbons having a normal boiling point of at least 480° C., at least 520° C., or at least 565° C. As used herein, heavy distillate feedstocks, or like terms referring to distillate hydrocarbons, are defined as a hydrocarbon fraction having boiling points or a boiling range below about 565° C. Heavy distillate feedstocks that may be used with processes disclosed herein may include various refinery and other hydrocarbon streams such as petroleum gas oils, straight run vacuum gas oils, hydrocracked vacuum gas oils, vacuum gas oils from an ebullated bed hydroconversion process, gas oils derived from one or more of shale-derived oils, coal-derived oils, tar sands bitumen, tall oils, bio-derived crude oils, black oils, as well as other similar hydrocarbon streams, or a combination of these, each of which may be straight run, process derived, hydrocracked, partially desulfurized, and/or partially demetallized streams.

A residuum hydrocarbon feedstock or a heavy distillate feedstock may initially be processed in a residue hydrocracking reactor system. Residue hydrocracking systems useful in embodiments herein may include, for example, ebullated bed hydrocracking reactors or reactor systems, as well as slurry-phase hydrocracking reactor systems, fixed-bed VGO hydrocracking reactor systems, and/or fluidized bed VGO hydrocracking reactor systems.

In some embodiments, the residue hydrocracking reactor system may include one or more ebullated bed hydrocracking reactors. Where multiple reactors are used, they may be arranged in series, parallel, or a combination of series and parallel. These ebullated bed reactors may include zeolite containing selective hydrocracking catalysts loaded with metallic hydrogenation components. The catalysts may be designed to have good fluidization and attrition resistant properties as well as selective hydrocracking performance properties. Ebullated bed systems absorb the heat of reaction as the enthalpy of the entering gas oil streams and the ebullated bed operates essentially at isothermal conditions due to enhanced heat (and mass) transfer provided by the energy of ebullating pumps. An allowable temperature spread between the gas oil stream feed and the isothermal ebullated bed temperature may range from about 50 to about 150° C., from about 75 to about 125° C., or from about 90 to about 100° C. Furthermore, the ebullated bed reactor is able to operate at substantially uniform catalyst temperatures throughout the operating cycle, unlike that of typical fixed-bed hydrocracking reactors.

Following hydrocracking, the effluent from the residue hydrocracking reactor system may be fed to a separation system including one or more separators, flash drums, distillation columns or other fractionation units. In the separation system, the hydrocracked products may be separated into two or more fractions, three or more fractions, or four or more fractions, based on boiling points of the cracked products. In some embodiments, the residue hydrocracker effluent may be separated into (i) one or more fractions having a boiling point of a heavy vacuum gas oil and lighter and (ii) a vacuum residue fraction. In general, the residue hydrocracker effluent may be separated into a light fraction (such as propane and lighter), one or more atmospheric distillate fractions (such as heavy gas oil and lighter), one or more vacuum distillate fractions (such as heavy vacuum gas oil and lighter), and a vacuum residue fraction.

In some embodiments, the cracked products may be fed to a separator, flash drum, or distillation column for separating light boiling components, including hydrogen and hydrocarbons, from the remaining heavier hydrocarbons. For example, the initial separations may separate a light fraction containing hydrogen and hydrocarbons having a normal boiling point of less than 25° C., less than 30° C., or less than 35° C., and a heavy fraction containing higher boiling hydrocarbons contained in the residue hydrocracked effluent. For example, the light fraction may include propane and lighter hydrocarbons in addition to hydrogen and other non-condensable gases that may be present in the residue hydrocracker effluent. In some embodiments, the initial separation may be conducted in a medium pressure high temperature (MPHT) separator.

The heavy fraction may then be fed to an atmospheric distillation unit, separating the hydrocarbons therein into two or more, three or more, or four or more fractions. The atmospheric distillation unit may be used, for example, to separate the heavy fraction into one or more distillate fractions and an atmospheric residue fraction. The one or more distillate fractions may include hydrocarbons boiling in the range of naphtha, diesel, kerosene, jet fuel, light gas oil, and heavy gas oil, which may be recovered in separate or various combined fractions.

The atmospheric residue fraction may then be fed to a vacuum distillation unit, separating the hydrocarbons therein into two or more, three or more, or four or more fractions. The vacuum distillation unit may be used, for example, to separate the atmospheric residue fraction into one or more vacuum distillate fractions and a vacuum residue fraction. The one or more vacuum distillate fractions may include hydrocarbons boiling in the range of light vacuum gas oil and heavy vacuum gas oil, which may be recovered in separate or combined fractions.

The vacuum residue fraction, which may also be referred to as unconverted oil (UCO) may then be fed to a coker unit. The vacuum residue fraction may be heated, for example, in a coker furnace to coking temperatures and fed to coke drums for conversion of the hydrocarbons in the vacuum residue into coke and thermally cracked hydrocarbons. The coke product produced may include sponge coke, shot coke, needle coke, anode grade coke, high volatile content material (high VCM) coke, or other typical coker products. In some embodiments, the coker unit may include one or more delayed cokers. The coking process, in addition to forming coke, may thermally crack hydrocarbons to form thermally cracked hydrocarbon products, recovered from the cokers as a vapor fraction.

The coker may be operated, for example, at a heater coil outlet temperature of at least 500° C., such as at least 520° C., and a pressure in the range from about 20 psig to about 35 psig. The coke drum vapor outlet temperature may be controlled to be at least 450° C., at least 460° C., at least 470° C., or at least 480° C. Drying times after the coking cycle may be at least 2 hours, at least 4 hours, at least 6 hours, or at least 8 hours, in various embodiments. Drying may be conducted, for example, by passage of a superheated vapor stream through the filled coke drum.

The coker vapor fraction recovered during the coking process may be fed to the separation system and fractionated into various fractions, as noted above, along with the residue hydrocracker effluent. In some embodiments, for example, the coker drum vapor effluent may be fed to the atmospheric distillation column for separation along with the residue hydrocracker effluent.

In some embodiments, the coker drum hot vapor effluent (at about 450° C., for example) may be flashed in a low pressure flash drum. The vapors from the low pressure flash drum may be combined with a straight run vacuum residue coker feed. The flash drum vapors, or the flash drum vapors and a straight run vacuum residue coker feed, may be fed to the atmospheric fractionator. In some embodiments, the flash drum vapors or the flash drum vapors and a straight run vacuum residue coker feed may be fed to the atmospheric distillation unit below a feed location of the hot liquid from the medium pressure high temperature separator. When used, the straight run vacuum residue may not be required to be heated, as the atmospheric fractionator bottom section (containing heavy partially resid liquid) is required to be cooled to minimize cracking and fouling. The atmospheric residue may then be sent to a vacuum column feed furnace. The low pressure flash drum liquid, already hot, may be combined at the vacuum column feed furnace discharge and sent to the vacuum column. In the vacuum column, products of both the residue hydrocracker unit and the coker unit are fractionated, as described above, producing one or more vacuum distillate fractions and a vacuum residue.

As described above, the vacuum residue, which may include the straight run vacuum residue coker feed and the residue hydrocracker unit's unconverted oil (boiling above the heaviest draw from the vacuum column), may be sent hot to the coker unit's feed furnace via a pump without any heat exchanger. The presence of the straight run vacuum residue may provide a solubility effect to the heavy asphaltenes left in the residue hydrocracker unconverted oil, and hence offers fouling mitigation, improving run time of the overall integrated unit.

The various distillate fractions recovered may be sent to further processing, as may be desired, to further convert, treat, or otherwise process the distillate fractions to form desired products. The additional processing may be used, for example, to further crack the hydrocarbons, remove nitrogen, CCR, metals, sulfur, and other impurities, and such processing may include hydrotreating, hydrocracking, hydrodesulfurizing, hydrodenitrogenating, hydrodemetallizing, or other various hydroprocessing of the distillate fractions, depending upon the objective of the unit.

As described above, embodiments herein may include use of straight run vacuum residue for its dilution/solubility effect at the residue hydrocracker fractionation section and feeding a coker unit vacuum residue from the residue hydrocracker vacuum column bottoms. This feature offers significant advantage in mitigating fouling in the fractionation section as compared to typical residue hydrocracking fractionation (without addition of a straight run vacuum resid to the atmospheric fractionation column).

Embodiments herein may additionally significantly reduce the equipment piece count. For example, embodiments herein may eliminate the coker wet gas compressor, naphtha, light coker gas oil and heavy coker gas oil side strippers, pumps and exchangers, the coker fractionator column and associated reflux drums, the coker fractionator light coker gas oil PA pumps, the heavy coker gas oil PA pumps and bottoms circulation pump, as well as the associated piping, valves, and instrumentation. Such a reduced piece count is possible as the residue hydrocracking and coking units are using one common system instead of separate dedicated systems. The integrated systems according to embodiments herein may thus offer a higher refinery operability and margins, due to decreased fouling and less downtime, and lower capital costs due to reduced piece count. Embodiments herein may further minimize the overall energy requirement, as utilizing the common fractionation system to fractionate the heavy coker gas oil product. The reduced piece count and energy requirements may further provide an advantage of a lower CO2 footprint and a smaller plot plan footprint.

Referring now to FIG. 1, a simplified process flow diagram of integrated cracking and coking units according to embodiments herein is illustrated. A residuum hydrocarbon fraction 10 may be fed to a residue hydrocracking unit 12 including one or more residue hydrocracking reactors. When multiple reactors are used, they may be disposed in series and/or parallel.

An effluent 14 may be recovered from the residue hydrocracking unit 12. The effluent 14 may then be fed as a first feed to a common separation system 16. Additional feeds to the common separation system may include coker vapor effluent stream 26 and straight run vacuum residue feed 28. The common separation system may then be used to separate the feeds into one or more distillate fractions 18 and a residue coker feed fraction 20.

The coker feed fraction 20 may be fed to a coker unit 22, which may include a heater and one or more coker drums. The coker unit may be used to crack a portion of the feed, recovered as coker vapor stream 26, and to produce a coke product 24, such as sponge, shot, needle, or anode grade coke.

The one or more distillate fractions 18 may be fed to hydroprocessing system 30, which may include one or more hydrotreaters, hydrocrackers, or other unit operations to upgrade the distillate fractions 18. The one or more effluents 32 from hydroprocessing system 30 may then be fed to a separation system 34, which may be used to recover one or more recycle or product fractions, such as offgas, hydrogen recycle, light hydrocarbon gases (sweet fuel gas, LPG, or other fractions including C3 and lighter hydrocarbons, for example), naphtha range hydrocarbons (full range naphtha, light naphtha, medium naphtha, and/or heavy naphtha), diesel range hydrocarbons, vacuum gas oil, kerosene range hydrocarbons, and/or other various hydrocarbon fractions of various boiling ranges.

As described above, a straight run vacuum residue feed 28 may provide a dilution and solubility effect in the separation system 16. While noting straight run vacuum residue as a preferred feed, other feeds having appropriate H:C ratios, aromaticity, and other factors to provide a solubility effect to the heavy components in the residue hydrocracking effluent may be used. As the product mixture in the residue hydrocracker effluent may depend on the residue hydrocracking unit feed, reactor severity, and numerous other factors, the feedstock used to obtain the dilution and solubility effect should be selected appropriately. It has been found that a straight run vacuum residue feed provides a benefit regardless of the residue hydrocracking system variables, as such generally contains a mixture of appropriate hydrocarbons to provide the desired effect to a wide range of hydrocracker residues.

Figure 2:
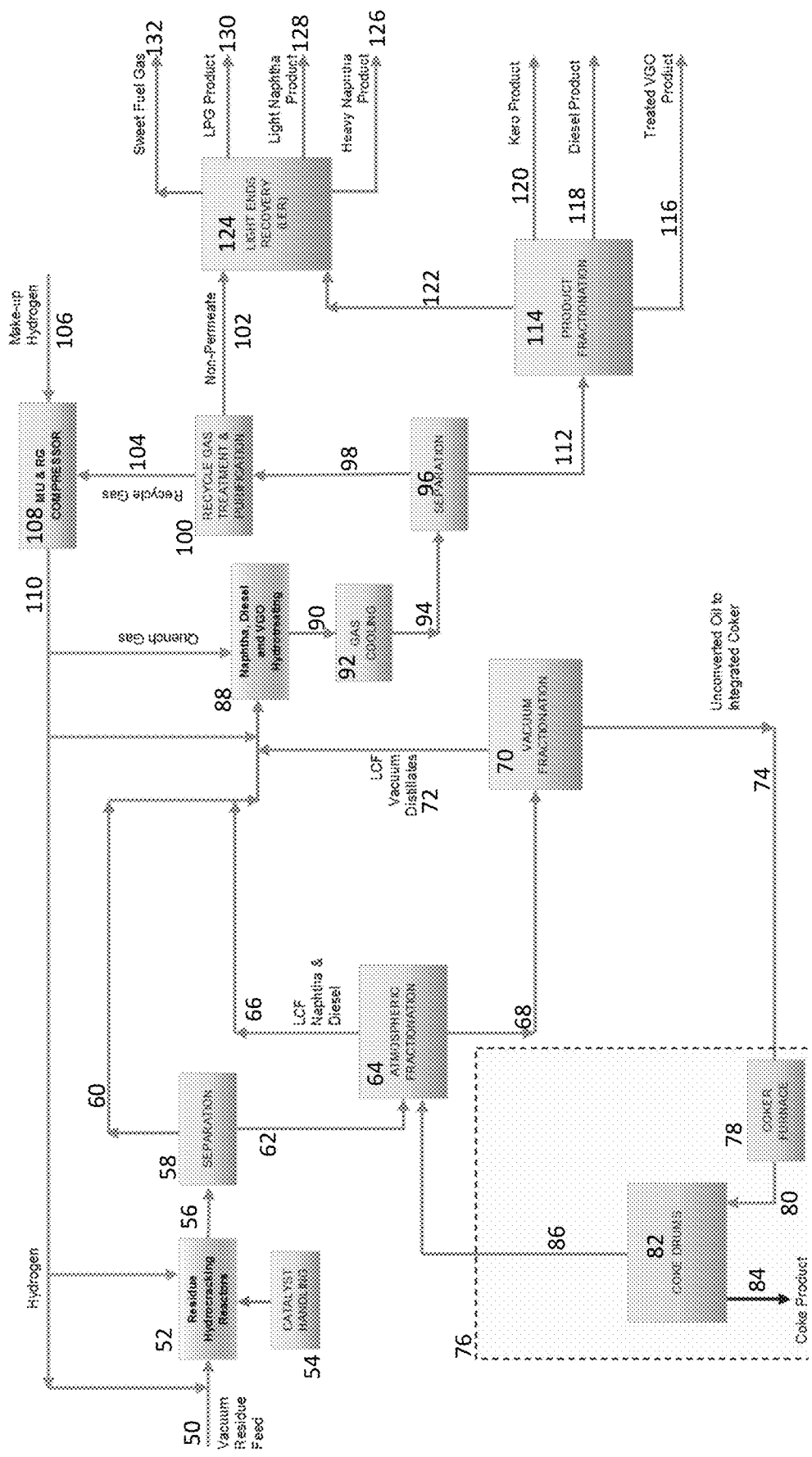

Referring now to FIG. 2, a simplified block flow diagram of integrated processes according to embodiments herein is illustrated. A residuum hydrocarbon feedstock or a heavy distillate feedstock 50 and a hydrogen stream 110 may be fed to a residue hydrocracking reactor system 52. The hydrogen may be blended with the feedstock upstream of the reactors and/or may be fed directly to the reactors for admixture and reaction with the feedstock. In some embodiments, the residue hydrocracking reactor system 52 may include one or more ebullated bed reactors along with an appropriate catalyst handling system 54 for withdrawing spent catalyst, regenerating the catalyst, and feeding regenerated and/or fresh catalyst to the reactor.

Following hydrocracking, the effluent 56 from the residue hydrocracking reactor system may be fed to a separation system 58, which may include one or more separators, flash drums, distillation columns or other fractionation units. In the separation system 58, the hydrocracked products may be separated into two or more fractions, as described above, based on boiling points of the cracked products. In some embodiments, the residue hydrocracker effluent 56 may be separated into a light fraction 60 (such as propane and lighter, including unreacted hydrogen), and a heavy fraction 62.

The heavy fraction 62 may then be fed to an atmospheric distillation unit 64, separating the hydrocarbons therein into one or more distillate fractions 66 and an atmospheric residue (bottoms) fraction 68. The one or more distillate fractions 66 may include hydrocarbons boiling in the range of naphtha, diesel, kerosene, jet fuel, light gas oil, and heavy gas oil, which may be recovered in separate or various combined fractions.

The atmospheric residue fraction 68 may then be fed to a vacuum distillation unit 70, separating the hydrocarbons therein into one or more vacuum distillate fractions 72 and a vacuum residue (bottoms) fraction 74. The one or more vacuum distillate fractions 72 may include hydrocarbons boiling in the range of light vacuum gas oil and heavy vacuum gas oil, for example, which may be recovered in separate or combined fractions.

The vacuum residue fraction 74 may then be fed to a coker unit 76 for the production of coke. The vacuum residue fraction 74 may be heated, for example, in a coker furnace 78 to coking temperatures or to only incipient coking temperatures, producing a heated coker feed 80. The heated coker feed 80 may then be fed to coke drums 82 for conversion of the hydrocarbons in the vacuum residue into a coke product 84 and thermally cracked hydrocarbons recovered as a coker vapor stream 86. While not illustrated, steam (or water prior to heating in the furnace) or other superheating media may be fed to the coker furnace and/or coke drums to provide additional heat for the thermal cracking process.

The coker vapor fraction 86 recovered during the coking process may be fed to the residue hydrocracker effluent separation system and fractionated into various fractions, as noted above, along with the residue hydrocracker effluent. In some embodiments, for example, the coker drum vapor effluent 86 may be fed to the atmospheric distillation column 64 for separation along with the heavy fraction 62 from separator 58.

Light fraction 60, atmospheric distillate fraction(s) 66, and vacuum distillate fraction(s) 72 may be further processed, as desired, to further convert, treat, or otherwise process the distillate fractions to form desired products. The additional processing may be used, for example, to further crack the hydrocarbons, remove nitrogen, CCR, metals, sulfur, and other impurities, and such processing may include hydrotreating, hydrocracking, hydrodesulfurizing, hydrodenitrogenating, hydrodemetallizing, or other various hydroprocessing of the distillate fractions, depending upon the objective of the unit.

The distillate fractions 60, 66, 72 may be combined with hydrogen and processed collectively, as illustrated in FIG. 2, in one or more hydrotreating reactor systems 88, which may include fixed bed, moving bed, ebullated bed, slurry bed or other types of hydrotreating reactors. In other embodiments, the distillate fractions 60, 66, 72 may be processes separately in one or more hydrotreating reactor systems. Where hydrotreating reactor system(s) 88 include multiple reactors, they may be arranged in parallel and/or in series.

As may be appropriate for the one or more fractions being processed, the one or more hydrotreated effluents 90 may be quenched, such as with a portion of recycle gas 110, or may be cooled, such as in a gas cooling system 92. Gas cooling system 92 may include feed/effluent exchangers, liquid hydrocarbon quench, and/or other direct or indirect heat exchange to reduce a temperature of the one or more effluents 94.

Following cooling, the one or more cooled effluents 94 may be fed to an initial separation system 96, which may be a flash drum, a high temperature high pressure separation system, or other separation systems known to those skilled in the art for separating unreacted hydrogen and other light reaction products, such as hydrogen sulfide, from heavier hydrocarbons. In some embodiments, separation system 96 may be used to separate a light fraction 98, including light hydrocarbons, such as methane, ethane, ethylene, and possibly propane and propylene, along with hydrogen sulfide, hydrogen, and other non-condensable gases, from a heavy fraction 112, which may include C3+ or C4+ hydrocarbons for example. Other cut points, such as C5+ or C6+ may also be used.

Light fraction 98 may then be processed in a recycle gas treatment and purification system 100. Treatment and purification system 100 may include one or more amine treatment units, membrane separation systems, pressure swing adsorption systems, or other units known to those skilled in the art to purify and recover a recycle hydrogen gas stream 104, a light hydrocarbon stream 102, and one or more byproduct/impurity streams (not shown), such as a sour gas stream. The recycle hydrogen gas stream 104 may be combined with a fresh or make-up hydrogen feed 106, compressed in a compressor 108, and returned to the various reaction units via hydrogen feed stream 110, which, as noted above, may feed hydrogen to the residue hydrocracking system 52 and the one or more hydrotreating reactor systems 88, among others.

Heavy fraction 112, which may include C2+, C3+ or C4+ hydrocarbons, for example, may be fed to a product fractionation zone 114, which may include one or more distillation columns for fractionally separating the heavy fraction into various cuts. As illustrated in FIG. 2, product fractionation zone 114 may separate the heavy fraction 112 into a treated vacuum gas oil product 116, a diesel product 118, a kerosene product 120 and a light hydrocarbon fraction 122. Other cut points and products may be used or additionally recovered in various envisioned embodiments.

Light hydrocarbon fraction 122 and light hydrocarbon stream 102 may be fed to a light ends recovery unit 124, which may include one or more distillation columns for fractionally separating the feeds into various hydrocarbon cuts. In light ends recovery unit 124, for example, the hydrocarbons in the light hydrocarbon fraction 122 and the light hydrocarbon stream 102 may be separated via fractionation into a sweet fuel gas fraction 132, an LPG product fraction 130, a light naphtha product 128, and a heavy naphtha product 126. Other cut points and products may be used or additionally recovered in various envisioned embodiments.

Figure 3:
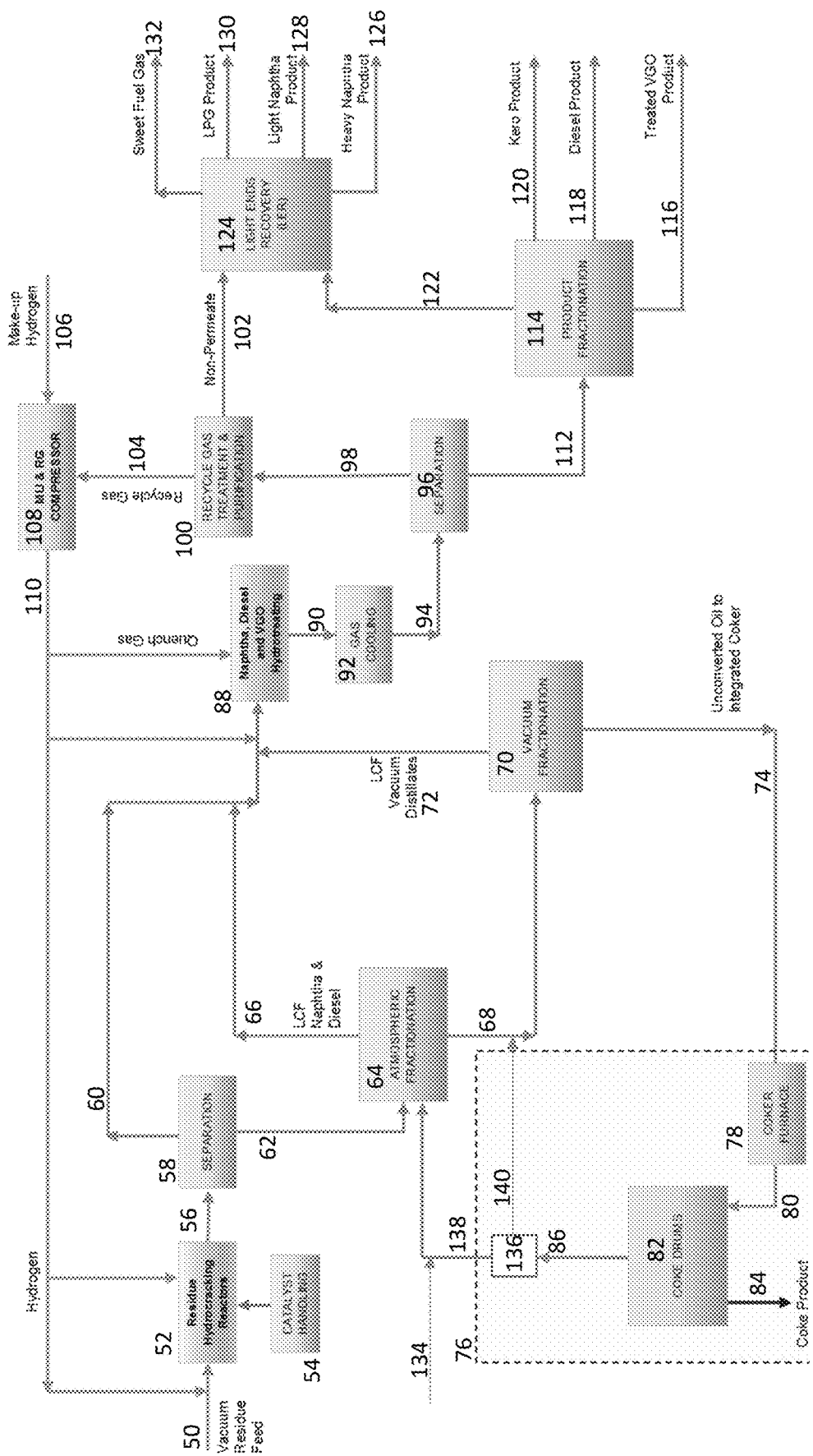

Referring now to FIG. 3, a simplified block flow diagram of integrated processes according to embodiments herein is illustrated, where like numerals represent like parts. In the embodiment illustrated in FIG. 3, the coker drum vapor stream 86 may be fed to a low pressure flash drum 136, recovering a vapor stream 138 and a liquid stream 140. The flash drum vapors 138, or the flash drum vapors 138 and a straight run vacuum residue coker feed 134 may be fed to the atmospheric distillation unit 64 below a feed location of the hot liquid 62 from the medium pressure high temperature separator 58. When used, the straight run vacuum residue 134 may not be required to be heated, as the atmospheric fractionator 64 bottom section (containing heavy partially resid liquid) is required to be cooled to minimize cracking and fouling. The low pressure flash drum liquid 140, already hot, may be combined with the atmospheric residue 68 and sent to the vacuum column 70. In the vacuum column 70, the products of both the residue hydrocracker unit and the coker unit are fractionated, as described above, producing one or more vacuum distillate fractions 72 and a vacuum residue 74.

Embodiments herein, as described above, may improve the residue hydrocracking unit operating factor, which is critical for a refiner. For typical residue hydrocracking systems, depending upon feed and severity, fractionation section fouling can cause residue hydrocracking unit shutdown once or more than once a year, and may require about two weeks for cleaning the vacuum tower bottom section. This requires, in many instances, turning the whole refinery at lower than design throughput. In contrast, embodiments herein utilize the solubility and dilution effect of coker vapors to improve operations within the residue hydrocracking fractionation system, and thus improve the overall operating factor of the refinery. Embodiments herein may additionally reduce piece count and the associated capital expense of the coking and residue hydrocracking units, and may also reduce carbon and plot footprints, as noted above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A process for the production of distillate hydrocarbons and coke, the process comprising:
    feeding a hydrocarbon feedstock, comprising a residuum hydrocarbon fraction, to a residue hydrocracking reactor system to convert hydrocarbons therein, producing a hydrocracked effluent;
    in a separation system, separating the hydrocracked effluent into one or more distillate hydrocarbon fractions and a vacuum residue fraction, wherein the separation system comprises a light gas separator, an atmospheric distillation unit, and a vacuum distillation unit, the separating the hydrocracked effluent comprising:
        in the light gas separator, separating the hydrocracked effluent to recover a light fraction, containing hydrogen and hydrocarbons having a boiling point of less than 35° C., and a heavy fraction;
        in the atmospheric distillation unit, separating the heavy fraction into one or more atmospheric distillate fractions and an atmospheric residue fraction;
        in the vacuum distillation unit, separating the atmospheric distillate fraction into one or more vacuum distillate fractions and the vacuum residue fraction;
    in a coker system, converting the vacuum residue fraction into a coke product and a coker vapor effluent, recovering the coke product, and feeding the coker vapor effluent to the separation system;
    hydroprocessing the one or more distillate hydrocarbon fractions to produce a hydroprocessed effluent; and
    separating the hydroprocessed effluent into product distillate hydrocarbon fractions.

2. The process of claim 1, comprising feeding a straight run vacuum residue to the separation system.

3. The process of claim 1, wherein the residue hydrocracking reactor system comprises one or more ebullated bed reactors.

4. The process of claim 1, comprising feeding a straight run vacuum residue to the atmospheric distillation unit.

5. The process of claim 1, wherein the coker system comprises a flash drum, the process comprising:
    separating the coker vapor effluent in the flash drum to recover a coker liquid fraction and a coker vapor fraction;
    feeding the coker vapor fraction to the atmospheric distillation unit; and
    feeding the coker liquid fraction to the vacuum distillation unit.

6. The process of claim 1, comprising recovering hydrogen from the hydroprocessed effluent and feeding recovered hydrogen to the residue hydrocracking reactor system.

7. A system for the production of distillate hydrocarbons and coke, the system comprising:
    a residue hydrocracking reactor system configured to receive a hydrocarbon feedstock, comprising a residuum hydrocarbon fraction, and to convert hydrocarbons therein to produce a hydrocracked effluent;

a separation system configured for receiving and separating the hydrocracked effluent into one or more distillate hydrocarbon fractions and a vacuum residue fraction, wherein the separation system comprises a light gas separator, an atmospheric distillation unit, and a vacuum distillation unit, the light gas separator is configured for separating the hydrocracked effluent to recover a light fraction, containing hydrogen and hydrocarbons having a boiling point of less than 35° C., and a heavy fraction;

the atmospheric distillation unit is configured for separating the heavy fraction into one or more atmospheric distillate fractions and an atmospheric residue fraction; and the vacuum distillation unit is configured for separating the atmospheric distillate fraction into one or more vacuum distillate fractions and the vacuum residue fraction;

a coker system configured for receiving and converting the vacuum residue fraction into a coke product and a coker vapor effluent;

a flow line for feeding the coker vapor effluent to the separation system;

a hydroprocessing reactor system configured for hydroprocessing the one or more distillate hydrocarbon fractions to produce a hydroprocessed effluent; and a second separation system configured for separating the hydroprocessed effluent into product distillate hydrocarbon fractions.

8. The system of claim 7, comprising a flow line for feeding a straight run vacuum residue to the separation system.

9. The system of claim 7, wherein the residue hydrocracking reactor system comprises one or more ebullated bed reactors.

10. The system of claim 7, comprising a flow line for feeding a straight run vacuum residue to the atmospheric distillation unit.

11. The system of claim 7, wherein the coker system comprises a flash drum, and wherein:

the flash drum is configured for separating the coker vapor effluent and to recover a coker liquid fraction and a coker vapor fraction;

a flow line for feeding the coker vapor fraction to the atmospheric distillation unit; and a flow line for feeding the coker liquid fraction to the vacuum distillation unit.

12. The system of claim 7, comprising a hydrogen recovery system configured for recovering hydrogen from the hydroprocessed effluent, and a flow line for feeding recovered hydrogen to the residue hydrocracking reactor system.

* * * * *